United States Patent [19]

Schultz

[11] Patent Number: 4,519,379
[45] Date of Patent: May 28, 1985

[54] CONTROL SYSTEM FOR SOLAR HEATERS

[76] Inventor: Robert T. Schultz, P.O. Box 633, Wrightwood, Calif. 92397

[21] Appl. No.: 507,337

[22] Filed: Jun. 24, 1983

[51] Int. Cl.³ .............................................. F24J 3/02
[52] U.S. Cl. ................... 126/422; 126/419; 126/432; 356/226
[58] Field of Search ............... 126/419, 422, 432; 236/91 C, 78 B; 356/226; 250/238

[56] References Cited

U.S. PATENT DOCUMENTS

| | | | |
|---|---|---|---|
| 2,666,586 | 1/1954 | Locke et al. | 236/91 C X |
| 3,246,839 | 4/1966 | Steghart et al. | 236/91 C |
| 4,020,897 | 5/1977 | Enter | 236/91 C X |
| 4,125,107 | 11/1978 | Nurnberg | 126/437 X |
| 4,291,674 | 9/1981 | Comte et al. | 126/419 |
| 4,408,712 | 10/1983 | Naganoma et al. | 236/91 D X |

FOREIGN PATENT DOCUMENTS

| | | | |
|---|---|---|---|
| 2463371 | 3/1981 | France | 126/419 |
| 70352 | 4/1982 | Japan | 126/432 |
| 1573104 | 8/1980 | United Kingdom | 126/419 |

*Primary Examiner*—Samuel Scott
*Assistant Examiner*—Kenichi Okuno
*Attorney, Agent, or Firm*—Bruce L. Birchard

[57] ABSTRACT

A solar-heating system incorporating a photosensitive sensor locatable remotely from the collector panels but similarly oriented with respect to the solar-energy source, such photosensitive sensor being biased by one or more biasing resistors of predetermined magnitudes and temperature coefficients so that the combination, in its performance with respect to ambient temperature and (optionally) with respect to ambient wind velocity, matches the thermal characteristics of the solar energy collection system so that the solar-energy collection fluid is pumped only when it can contribute heat energy to the already stored solar-heated fluid.

6 Claims, 3 Drawing Figures

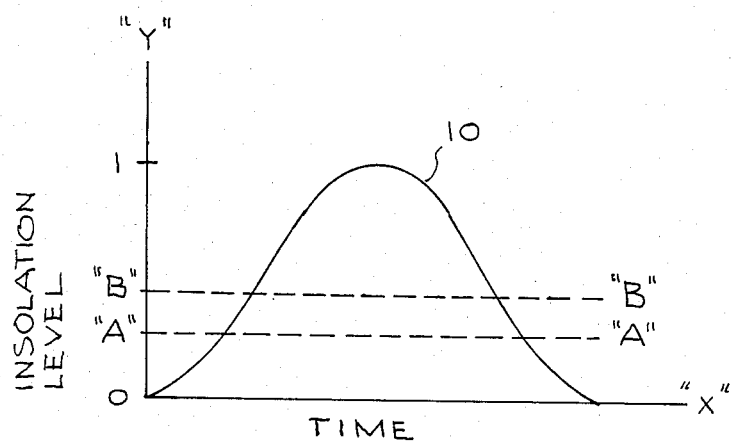
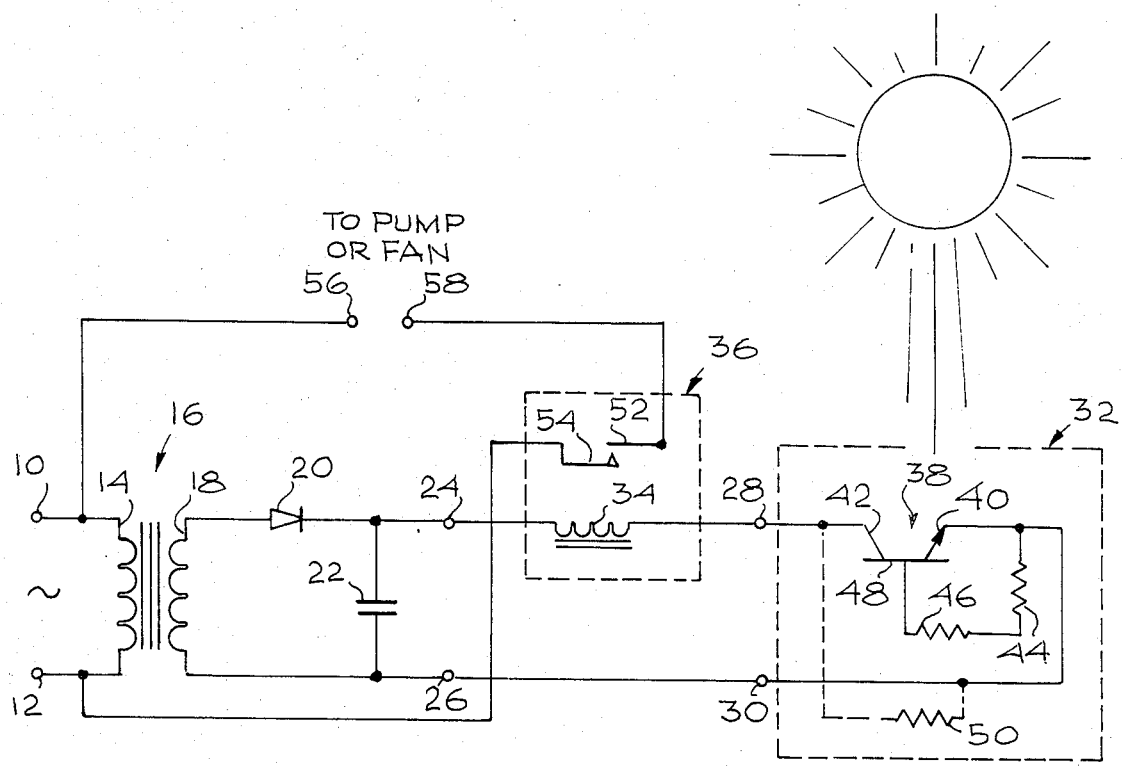

CONTROL SYSTEM FOR SOLAR HEATERS

BACKGROUND OF THE INVENTION

1. Field of the Invention

This invention relates to solar heating systems and, more particularly, to improved control systems for such heating systems.

2. Prior Art

In the past, particularly in connection with solar hot water heating systems, it has been the practice to switch on and off, in response to signals from temperature-differential thermostats, the pump which circulates the solar-heated fluid. Circulation is stopped when the temperature of the circulating fluid falls below the temperature of the already stored, heated water or other fluid. Such a system is subject to "hunting" when the temperature of the stored water and that of the circulating water approach each other.

Such "hunting" or random on-off cycling of the circulation pump is caused by such phenomena as water temperature stratification or by improper sensor location. The results are wasted energy, both electrical and thermal. Unnecessary pump, switch and relay wear also occur.

Therefore, it is an object of my invention to overcome the general disadvantages of prior art control systems in solar heating systems.

It is a further object of my invention to provide a control system which is matched in its thermal characteristics to the thermal characteristics of the solar energy collection system it is controlling.

It is an additional object of my invention to provide a control system for solar heating systems in which automatic compensation is made for ambient temperature variations.

SUMMARY OF THE INVENTION

A photosensitive sensor is utilized in combination with a biasing resistor of predetermined magnitude and temperature coefficient to match, in its performance with respect to ambient temperature and other secondary variables, the thermal characteristics of the solar energy collection system so that the solar energy collection fluid is only pumped when it can contribute heat energy to the already stored solar-heated fluid. Since this is an openloop system the problems of "hunting" and undesired cycling encountered with differential thermostatic systems are avoided. Further, the complexity of the control system is less and its reliability greater then those factors found in conventional control systems.

BRIEF DESCRIPTION OF THE DRAWINGS

My invention can be understood best by referring to the description which follows and taking that description in connection with the drawings herein, in which:

FIG. 1 is a graph of a natural phenomenon related to this invention; and

FIG. 2 is a schematic diagram of a circuit incorporating my invention; and,

DETAILED DESCRIPTION OF THE PREFERRED EMBODIMENT

Figure 3:
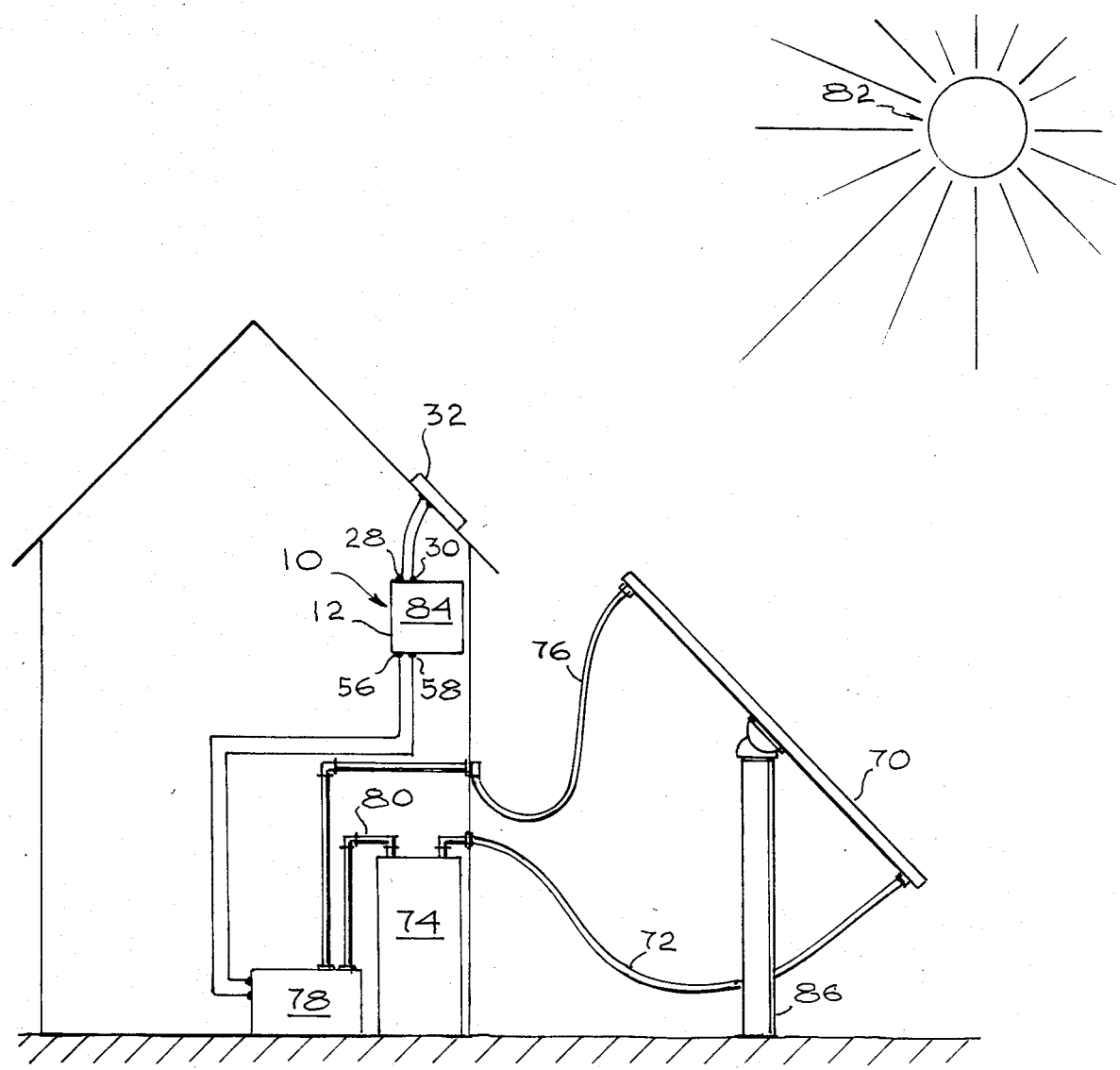
FIG. 3 is a schematic diagram of a solar-heating system according to my invention.

In FIG. 1, curve 8 represents the normal diurnal variation in insolation for a clear day. For a given solar energy collection system operating in a first ambient temperature the solar-fluid pump switch-on level is represented by the line "A" which intercepts the "Y" axis at the first insolation level "A". Between levels "O" and "A" are the inherent losses of the collection system, e.g., glazing transmission losses, re-radiation losses, conductive losses and the like which prevent the collection system from making a positive contribution to stored thermal energy in the system. In the event of a reduction in ambient temperature the insolation level must rise to the level "B" before the collection system can make a positive contribution to stored thermal energy. Thus, the pumping or fan means is kept "off" until the insolation level "B" is reached. Thus the turn-on level is automatically varied from level "A" to level "B" as an inverse function of ambient temperature.

The circuit to achieve this desired goal is shown in FIG. 2. In FIG. 2, alternating current at, say 110 volts and 60 $H_z$ is applied to terminals 10, 12 of primary 14 in transformer 16. The reduced voltage which appears across secondary 18 of transformer 16 is rectified by diode 20 and with the help of filter capacitor 22, a d.c. voltage appears across terminals 24, 26. That d.c. voltage is applied to terminals 28, 30 of sensor module 32 by way of solenoid 34 in normally-open relay 36. Phototransistor 38 in sensor module 32 has its emitter 40 connected to one d.c. source terminal 26 through sensor module terminal 30 and its collector 42 connected to the other terminal 28 of module 32 and thence, thru solenoid 34 to the other d.c. source terminal 24. A pair of biasing resistors 44 and 46 is connected between emitter 40 and base 48 of phototransistor 38. Phototransistor 38 may be a Fairchild FPT 120, or its equivalent, for example. Resistor 44 is of the silicon variety having a predetermined and positive temperature coefficient of 0.7% per degree centigrade. Such a device is available from Texas Instruments Corporation and is sold, by them, under the trademark, "Sensistor". The available resistance range of such devices is, typically, from 4,000 to 20,000 ohms. The resistance versus temperature curve is somewhat tailored by the series connection of relatively temperature-insensitive resistor 46. The tailoring and choice of resistors 44 and 46 is made so that the overall temperature response of sensor module 32 corresponds to that of the companion solar energy collection system, both as to initial operating or "turn-on" point ("Y"-intercept level) and as to slope of temperature response curve after pump or fan operation commences. When phototransistor 38 turns on current flows thru solenoid 34 closing contacts 52, 54 of relay module 36 and applying operating a.c. voltage across terminals 56, 58 for application to a heat-transfer pump or fan, not shown. With the resistor 44 having a resistance-temperature characteristic of +0.7% per degree centigrade and the proper choice of fixed resistor 46, the desired "Y"-intercept and slope of any collector from an evacuated tube to a single-glazed flate-plate collector can be achieved.

Wind-cooling losses can be compensated for in this system by intentionally dissipating in sensor module 32 a fixed amount of power, e.g. one-fourth watt, as by means of auxiliary resistor 50. As the wind velocity in the collecting and sensing area increases, the heat generated by resistor 50 will be proportionately removed and the control of my invention will compensate for wind losses in a way analogous to that in which it compensates for changes in the ambient temperature. In actual installations this feature has been found useful in connection with unglazed collection panels.

The sensor module 32 of my invention is easy to install. Phototransistor 38 need only "see" the same sun as its associated collecting panels. It can be remotely located with no change in system performance. Module 32 need not be in thermal contact with the collector panels or the thermal storage means. This relationship is made more clear in the drawing of FIG. 3. In FIG. 3, solar-energy collector panel 70 receives fluid to be heated through pipe or hose 72 which is coupled to the lower portion of collector panel 70, as shown. That liquid to be heated comes from thermal energy storage means 74 and heated fluid from collector panel 70 is taken from collector panel 70 by means of exit pipe or hose 76 through pumping means 78 which feeds the heated fluid from collector panel 70 through tube or pipe 80 to thermal storage means 74. Sensor module 32, described in FIG. 2, is mounted on some convenient support means such as the roof of a house so as to face solar-energy source 82. The control terminals 28 and 30 of sensor module 32 are connected as shown in FIG. 2 to their associated elements. Those elements may be included in a terminal box 84, as shown in FIG. 3. It should be noted that collector panel 70 and sensor module 32 are oriented to "see" solar-energy source 82 in the same fashion. It should be noted that sensor module 32 is remote from collector panel 70 and from thermal storage means 74. Any appropriate support means, such as pole 86 may be provided to support collector panel 70 with the proper orientation.

Thus I have provided for solar heating systems a control system that has a minimum of components for maximum reliability, which matches the thermal-response characteristics of its associated solar energy collection system and which eliminates the heat energy losses produced by prior art control systems.

While a particular embodiment of my invention has been shown and described, it will be apparent to those skilled in the art that variations and modifications may be made herein without departing from the spirit or scope of my invention. It is the purpose of the appended claims to cover all such modifications and variations.

I claim:

1. A solar-heating system including:
   solar-energy collecting means for collecting energy from a solar-energy source;
   transferring means for transferring elsewhere solar-generated heat energy from said solar-energy collecting means; and,
   control means for controlling said transferring means, said control means including:
   terminal means adapted to receive operating power for said transferring means;
   a source of D.C. operating power for said control means;
   a relay having a solenoid and at least one pair of normally-open contacts;
   a sensor module including a phototransistor having a collector, an emitter and a base;
   said sensor module also including a temperature-sensitive resistor coupled between said emitter and said base of said phototransistor;
   said collector being coupled through said solenoid to said source of D.C. operating power;
   said phototransistor being responsive to solar energy incident thereon to become conductive at a solar energy level dependent upon the magnitude of said temperature-sensitive resistor;
   said relay being responsive to conduction by said phototransistor to close said normally open contacts;
   said normally open contacts being adapted for serial connection between at least one of said terminal means and said transferring means;
   said sensor module being located remotely with respect to said solar-energy collecting means but facing said solar-energy source.

2. Apparatus according to claim 1 in which said sensor module includes a trimming resistor serially connected with said temperature-sensitive resistor between said emitter and said base of said phototransistor.

3. Apparatus according to claim 1 which includes, in addition, a wind-velocity compensating resistor mounted in said sensor module and coupled across said source of D.C. operating power.

4. Apparatus according to claim 3 in which said temperature-sensitive resistor has a positive temperature coefficient of 0.7% per degree centigrade.

5. Apparatus according to claim 1 in which said temperature-sensitive resistor has a positive temperature coefficient of 0.7% per degree centigrade.

6. Apparatus according to claim 1 in which said source of D.C. operating power is an A.C. to D.C. power supply.

* * * * *